United States Patent
Mayor et al.

[11] 3,896,211
[45] July 22, 1975

[54] PURIFICATION OF IRON OXIDES

[75] Inventors: Yoland Pierre Paul Mayor; Pierre Francois Tord, both of Paris, France

[73] Assignee: Harle & Lechopiez, Paris, France

[22] Filed: Feb. 5, 1973

[21] Appl. No.: 329,460

Related U.S. Application Data

[63] Continuation of Ser. No. 763,785, Sept. 30, 1968, abandoned.

[30] Foreign Application Priority Data

Oct. 2, 1967   France .......................... 67.123049
Jan. 3, 1968   France .......................... 68.134647

[52] U.S. Cl. .................. 423/138; 423/44; 423/97; 423/632; 75/112
[51] Int. Cl. ... C01g 49/02; C21b 1/04; C22b 11/06
[58] Field of Search ........ 75/112, 114; 423/138, 44, 423/97, 632

[56] References Cited
UNITED STATES PATENTS

| | | | |
|---|---|---|---|
| 1,103,258 | 7/1914 | Brackelsberg | 75/111 X |
| 1,822,995 | 9/1931 | Meyer | 75/112 |
| 1,833,686 | 11/1931 | Meyer | 75/112 |
| 3,401,032 | 9/1968 | Renzoni et al. | 423/148 X |

*Primary Examiner*—Oscar R. Vertiz
*Assistant Examiner*—Brian E. Hearn
*Attorney, Agent, or Firm*—Hammond & Littell

[57] ABSTRACT

In the method of purifying iron oxides as such or obtained by roasting sulfur containing iron ores, in which said oxides are contacted in a reactor with a hot carrier gas and at least one halohydric gas a sufficiently high temperature to vaporize the resulting halogenides and to allow said vaporized halogenides to be carried off by said carrier gas, an easier removal of the impurities is achieved, and undesired reactions such as formation of iron chlorides and of free halogens are avoided by maintaining the presence, in the reactor, of about 0.5 to about 10 parts by weight, and preferably about 4 parts by weight, of steam per each part by weight of halohydric gas.

6 Claims, 4 Drawing Figures

PURIFICATION OF IRON OXIDES

This is a continuation of Ser. No. 763,785 filed Sept. 30, 1968, now abandoned.

The present invention relates to the purification of iron oxides as such or resulting from the roasting of sulfur containing iron ores.

It is a well known fact that the hematite rich calcines or cinders resulting from the roasting of sulfurous iron ores, such as pyrites, pyrrhotines and the like, are in fact an excellent iron source. However, use of such cinders in the iron and steel metallurgy is in most cases precluded or made very difficult due to the fact that they contain numerous noxious impurities such as zinc, lead, copper, aluminum, bismuth, antimony, selenium, arsenic and the like, together with further, less troublesome, but still undesirable impureties such as, for example, silicon, silicates, calcium carbonate and the like. The same occurs for some oxidized iron ores which are of low value or even unusable owing do impurities such as arsenic antimony various heavy metals, etc. such as present is small quantities.

It has since long been attempted to remove said impurities in order to make it possible to use said cinders for metallurgical purposes, said use being all the more desirable that rich ores are becoming less and less available. The methods known as "chlorinating roasting" give the possibility of converting the non-ferrous metals to chlorides and sulfates which can thereafter be extracted by methodical lixiviation. Chlorinating roasting, however, entails a high consumption of heat and lixiviation is a complex and time taking operation through which it is not possible to lower the contents of certain non-ferrous metals down to the limits which are desired in modern metallurgy. Furthermore the obtained saline solutions always contain a substantial proportion of iron in the form of chloride and sulfate.

It has also been suggested to treat the cinders with chlorinating substances, such as chlorine, thionyl chloride, sulfur chloride, and the like at a sufficiently high temperature for the resulting metal chlorides to distill or be sublimated and be carried away by a carrier gas such as air or flue gas. Since the reaction medium is oxidizing, all the elements are brought to their maximum oxidation stage. The temperature should reach 900°C or above; In said conditions impurities such as arsenic, antimony and the like are blocked in the form of non volatile arseniates, antimonates, and the like. Furthermore heating at 900°C or above poses problems in connection with the materials used for the apparatus, which are particularly difficult to solve because of the high reactivity of chlorine. A high consumption of heat is also required.

It has therefore been suggested to first of all reduce the hematite in the cinders to magnetite, and then to treat said magnetite, in a second step at relatively low temperature with gaseous chlorinating agent such asx chlorine or hydrochloric gas, thereby removing the readily volatile chlorides such as arsenic, antimony, tin and the like chlorides. In order to remove the less volatile chlorides such as zinc, copper, lead, gold chlorides, and the like, the residues must be heated in a third step at a temperature of 900°C or more, in an oxidizing medium and in the presence of a chlorinating agent. As a result, the magnetite is reoxidize to hematite and the heat produced by said oxidation assists in obtaining the high temperature required. If however it is then desired to remove impurities such as silicon, silicates and the like by magnetic separation the hematite must be again reconverted to magnetite in a fourth step by means of a reducing gas. This process is uneconomical by reason of the numerous steps which are involved. Furthermore, tests have shown that when iron oxides are treated by an anhydrous chlorinating agent in a reducing medium, or when said oxides are previously reduced, iron chloride is always produced, which according to the temperature is either carried of by the carrier gas or remains in the iron oxide where its presence is undesirable.

Certain improvements have been made in the above mentionned process in which chlorinating gases are used, whereby all the non-ferrous elements the halogenides of which are more volatile than the corresponding iron halogenides may be extracted by dry means. To this end the cinders are treated at a temperature preferably between 600°C and 700°C by a carrier gas to which a quantity of halohydric gas is added, at least equal to that which is theoretically needed to form the chlorides of the elements which it is desired to remove, whereby the non-ferrous metals are converted to halogenides which are carried off in the vapor state by the carrier gas, provided their boiling point is lower than that of the iron halogenides which have formed. The halohydric gas may be substituted by an easily dissociable halogenide such as ammonium chloride. This process is commercially operable and is unique in that not only a very high degree of extraction of the undesirable elements is achieved, provided the halogenides thereof are more volatile than the corresponding iron halogenides, but also the iron losses are very low, and the reaction is rapid. Due however to the above mentioned limitations concerning the boiling point of the halogenides, impurities such as arsenic, antimony, tin, zinc and the like are removed in this process, but not metals the halogenides of which have a high boiling point, such as lead, copper, gold and the like. Where such metals are present, they must be removed by a further appropriate processing.

It should be observed that in the various dry processes which include a chlorination, anhydrous chlorinating agents are made use of, this because it is generally accepted that the presence of steam produces hydrolysis of the chlorides which form by the action of the reducing chlorinated agents, and prevents, or at least limits the extraction of said chlorides by distillation or sublimation.

In the course of our research work in the field of purification of iron oxides, we have surprisingly found that contrary to the admitted theories, steam does not hinder in any manner the formation of non-ferrous metal chlorides at high temperature.

Still further, when steam is present in sufficient quantity, it considerably facilitates the carrying off of metal chlorides from the reaction medium. We have found that it was thus possible to eliminate the less volatile chlorides such as copper, lead, gold and like metal chlorides, without heating at temperatures above 600°–700°C, whereas in the known methods for purifying iron oxides by chlorination, the removal of said less volatile chlorides in an anhydrous, or substantially anhydrous medium requires heating the reaction mass at temperatures of at least 1000°C, notwithstanding the other admitted drawbacks of said processes.

We have furthermore found that steam inhibits certain undesired reactions such as, on one hand, the formation of iron chlorides, whatever the nature of the treated iron oxide (hematite $Fe_2O_3$, magnetite $Fe_3O_4$, ferrous oxide FeO or various mixtures thereof), and on the other hand the formation of free halogens which occurs according to the Deacon reaction, particularly when the copper based impurity is present.

Further again, we have found that if steam does not facilitate the elimination of arsenic chloride, b.p. 130.2°C, it does not hinder said elimination.

It should be noted that when all the impurities which it is desired to remove form chlorides having a low boiling point, which is the case with aluminum, arsenic, antimony and the like, the same results are obtained as far as said removal is concerned, whether steam is present or not. However, when carrying out the purification in the presence of steam, no trace of iron can be found in the distillate and the purified iron oxides are completely free of soluble iron, this being true even if the treatment takes place in a reducing medium, whereas when operating in an anhydrous medium, it is practically impossible to avoid formation of iron chlorides, especially when a reducing atmosphere prevails or if the processed oxide has been previously totally or partially reduced.

One object of our invention is to provide a method for the purification of iron oxides as such or resulting from roasting of sulfur containing iron ores, by means of a halogenating agent, at a relatively low temperature, in which the impurities, and particularly the non ferrous metals present in said oxides, the halogenides of which have a higher boiling point than the corresponding iron halogenides are more easily removed than by the previously known methods.

Another object of our invention is to provide such a method for the purification of iron oxides, in which undesired reactions such as formation of iron chlorides and of free halogens are substantially avoided.

According to this invention, in a method for the purification of iron oxides resulting from the roasting of sulfur containing iron ores, in which the roasting cinders are contacted in a reaction zone with a hot carrier gas and with at least one halohydric gas, at a sufficiently high temperature for the resulting halogenides to be vaporized and carried off by said carrier gas, the presence of about 0.5 to about 10 parts by weight, preferably about 4 parts by weight, of steam per each part by weight of halohydric gas e.g. hydrochloric gas, is maintained in the reaction zone.

The quantity of steam which should be introduced with the halohydric gas may vary within wide limits. When hydrochloric gas is used, 0.5 part by weight of water for each part by weight of hydrochloric acid is sufficient to inhibit formation of chlorine and iron chloride. However, in order to carry off heavy metal chlorides, much higher proportions of water should be used, of the order of one to ten times the weight of hydrochloric acid. It is particularly, advantageous to use 4 parts by weight of water per 1 part by weight of hydrochloric acid since said proportion corresponds to the 20% hydrochloric acid azeotrope, which distills at 110°C without modification of its composition.

In the reaction zone where the halohydric gas reacts in the presence of steam with certain non-ferrous elements to form volatile halogenides, an intimate contact between the solid and gaseous phases should be achieved. Use may be made, for example, of a rotating furnace, but according to a preferred embodiment of the invention, the iron oxides are fluidized in the gas current.

The fluidizing gas current may then be formed for one part by flue gases which procure the heat required to obtain and maintain the necessary temperature, and for the other part by the steam resulting from the vaporization of the aqueous halohydric acid used to produce the halohydric gas. However, when the treated iron oxide contains a relatively high proportion of foreign elements and it desired to use a 20% aqueous hydrochloric acid as halogenating agent the quantity of steam may be too great. In order to procure a good fluidization while avoiding an exaggerated inflow of dust in the cyclones, the velocity of the gas should be comprised within rather narrow limits which are a function of the particle dimensions of the solids, e.g. between 15 and 20 cm per sec. Should the volume of gas be too high, then a reactor having a larger cross section than needed has to be chosen, account being taken of the period of time during which the reaction mixture should remain in the reactor. This technological drawback may be avoided by combining two reactors in series, the first of said reactors operating in the conditions of the above recalled, prior anhydrous method, and the second operating in the conditions of this invention. In the first reactor or furnace, the chlorides of those elements the chlorides of which are the more volatile are then totally or partially formed and carried off by a hot carrier gas such as neutral flue gases or flue gases containing excess oxygen or fuel, added with anhydrous hydrochloric gas in a quantity lower than that which is stoichiometrically required in order that it is totally consumed. In the second reactor, the metals which form less volatile chlorides, as well as what possibly remains of the elements which form more volatile chlorides are chlorinated and carried off by a hot carrier gas added with 20% hydrochloric acid vapor, in accordance with the invention.

The diluted acid may be fed in the carrier gas previously heated at the reaction temperature or at a higher temperature, either in the vapor state, either in the form of fine droplets which are vaporized by the sensible heat of the carrier gas.

It is important to observe that if an excess of hydrochloric acid is used, said excess is recovered in the condensate. Said condensate is formed by water which has been introduced with the acid, freed by the reaction, and possibly was contained in the carrier gas, and which holds in solution the chlorides which have formed and the excess hydrochloric acid. Said excess may be readily recovered by distillation, in the form of an azeotrope at 20% hydrochloric acid. It may be recycled, if desired without intermediary condensation. If the hydrochloric acid is totally or partially recovered in the course of the vaporization processing of the distilled chlorides, it is recovered in the form of a 20% azeotrope which is directly recycled. On the contrary, in the case of the prior anhydrous process, the recovered azeotrope must be dehydrated by means of concentrated sulfuric acid, and the advantages of this recovery are limited.

Instead of feeding a diluted halohydric acid in the carrier gas, the required halohydric gas may, if desired, be formed in situ from a halogenide precursor. To this end, use may be made, for example, of aqueous ammonium chloride which may either be atomized in the carrier gas current, or be used to paste up the metal oxides, or passed through an evaporator maintained by external heating at a temperature above 350°C, and then fed in the gaseous state to the reactor. Whatever the type of feeding used, ammonium chloride is completely dissociated above 350°C. The ammonium chloride solution is thereby converted to a mixture of steam, hydrochloric gas (HCl) and ammonia (NH₃). The ammonia behaves as an inert gas but since it is combustible its presence forbids, processing in an oxidizing medium.

When the gaseous mixture issuing from the reactor is cooled below the dew point the ammonia combines with the excess hydrochloric acid to form ammonium chloride and with the metal chlorides to form oxides or hydroxides, and ammonium chlorides. The ammonium chloride introduced in the circuit is thus integrally recovered.

The use of ammonium chloride is technically very advantageous due to the fact that, since a neutralization of the acid products takes place before or at the latest at the time of condensation, the reaction mixture is at no time corrosive. In order to obtain the maximum benefit of this advantage, a slight excess of ammonia may be added to the ammonium chloride solution.

As halohydric gas precursor, use may also be made of a halogen iron salt capable of emitting a halohydric gas such as iron chloride, bromide, iodide or fluoride. In the above described operational conditions said halogen salts are quantitatively and rapidly hydrolyzed according to reaction such as the following, in the case of iron chlorides:

FeCl₂ + H₂O = FeO + 2 HCl
2 FeCl₃ + 3H₂O = Fe₂O₃ + 6 HCl

Use of such halogen iron salts is particularly advantageous when the impurities in the treated oxidized iron ore are formed totally or for the major part of metals or compounds of metals the potential for conversion to cation is higher than that of iron, i.e. metals the salts of which are cementable by iron. Examples of such metals are cadmium, cobalt, nickel, copper, silver, gold, and the like.

In this case the said iron ore is heated at temperatures from 550°C to 700°C in the presence of a carrier gas and a solution of a halogen iron salt is fed to the reaction zone in such a proportion that the quantity of halohydric gas resulting from hydrolysis thereof is slightly above that which is stoichiometrically needed to convert the non-ferrous metals to their halogenides.

The condensate which is separated by cooling of the carrier gas after the reaction comprises water, which has been introduced with the iron salt solution, and possibly also with the carrier gas, and the possible excess halohydric gas and the halogen salts of non ferrous metals dissolved therein. Said non-ferrous metals can be cemented by addition of iron metal. The cemented metal or metals can then be separated through any known means such as decantation, filtration or the like from the iron halogenide solution which is recycled.

The successive reactions are thus

FeX₂ + H₂O = FeO + 2 HX    (1)
MeO + 2 HX = MeX₂ + H₂O    (2)
MeX₂ + Fe = Me + FeX₂    (3)

X being Cl, Br, I or F, and Me being a metal, the potential for conversion to cations is higher than that of iron.

The total result of the above reactions (1), (2) and (3) is:

MeO + Fe = FeO + Me

Iron is therefore consumed, in the form of cheap scraps such as filings, turnings, detinned tin plate, and the like but it is recovered in the form of pure iron oxide mixed with the purified iron. The halohydric acid is integrally recovered.

When the initial ore contains a minor proportion of metals the potential for conversion to cations is lower than that of iron, such as chromium, zinc, manganese and the like, said metals are not retained in the cementation reactor and the halogenides thereof are therefore recycled with the iron halogenide solution to the reaction zone where they are immediately vaporized. Said halogenides thus accumulate in the recycled solution and an aliquot part of said solution is tapped off from time to time to recover therefrom the said metals which cannot be cemented by iron. The volume of said tapping is selected according to the contents of said metals in the initial ore, in such a manner that the solution is never saturated with halogenides of said metals.

Our present method can be utilised without modification to directly purify natural iron ores.

This invention is illustrated by the following examples, in which reference is made to the appended drawings, in which.

Figure 3:
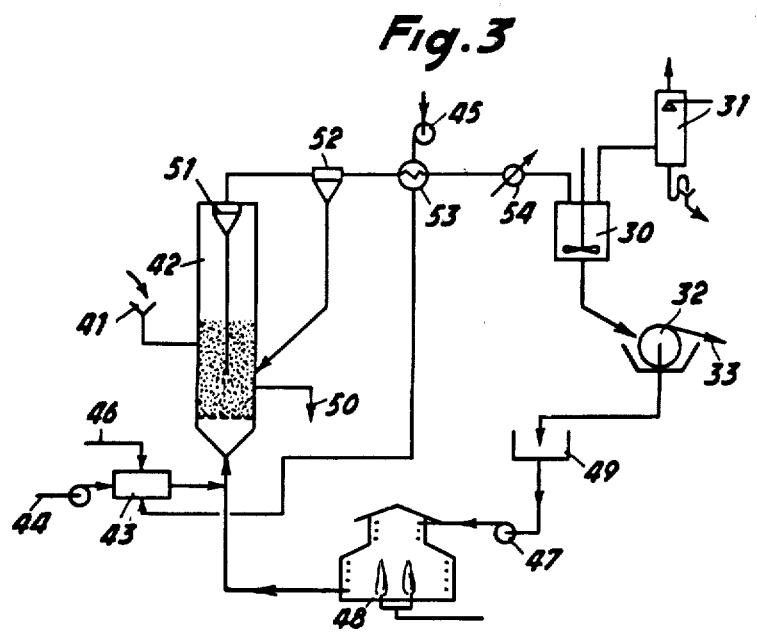

FIG. 3 corresponds to a modification of the process with ammonium chloride.

Figure 4:
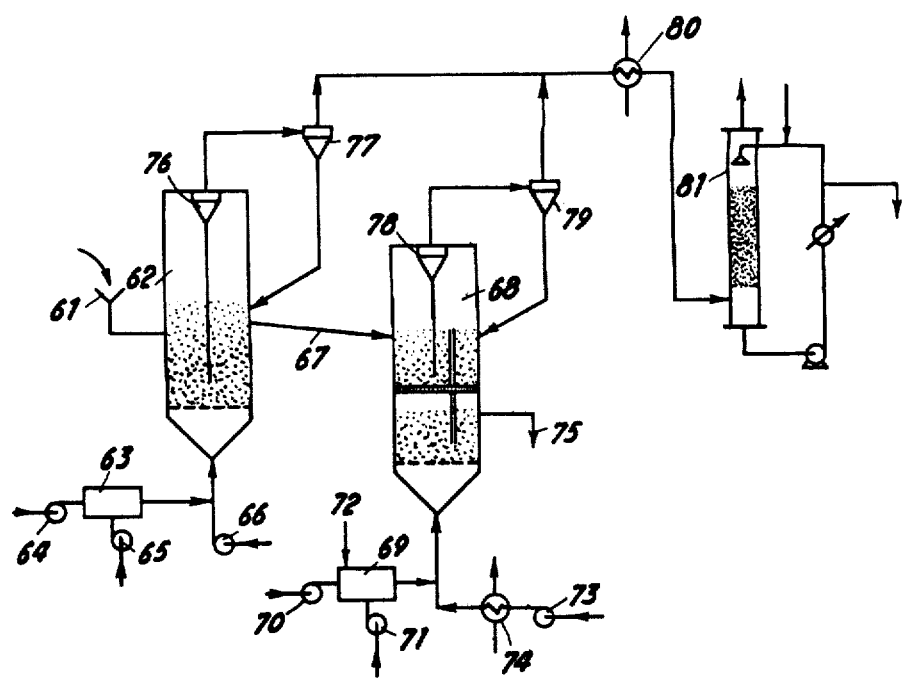

FIG. 4 corresponds to a combined process.

In the following examples, the percentages are by weight, unless otherwise advised.

EXAMPLE 1

Figure 1:
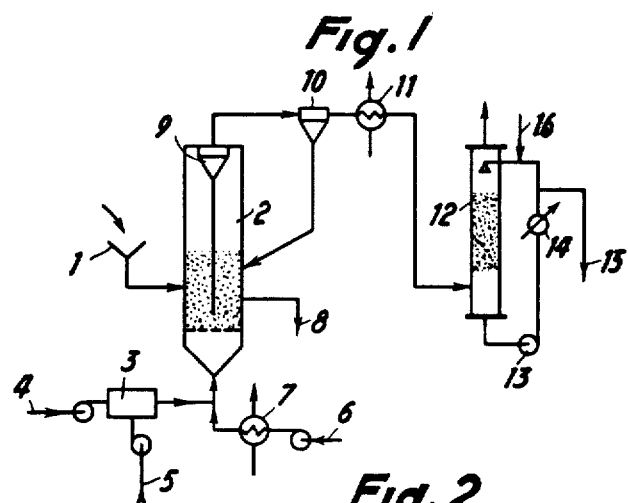
FIG. 1 is a diagrammatic representation of an apparatus for carrying out a first embodiment of the invention.

In this example, which is carried out in the apparatus shown at FIG. 1, 10 metric tons per hr. of pyrites cinders containing 11% SiO₂, 0.93% Zn, 0.94% Pb, 0.42% Cu, and 0.30% As milled to a grain size of less than 0.1 mm are continuously fed from a hopper 1 to a reactor or fluidization furnace 2. Fluidizing is achieved by means of flue gas produced by combustion in a combustion chamber 3, of about 150 c.m. per hr. of natural gas fed through line 4. Air for the combustion is fed through line 5 in such a proportion that the flue gas is neutral or contains a slight excess of oxygen. The fuel input is controlled in such a manner that the temperature of the fluidized bed is 650°C. The dimensions of the furnace are chosen such that the residence time of the iron oxide is 15 min.

1480 kg per hr. of 20% hydrochloric acid are fed to furnace 2 through line 6 and through a graphite heat exchanger 7. Said feed rate of hydrochloric acid corresponds to an 15% excess over the theoretical quantity required for converting the Zn, Pb, Cu and As contents of the initial ore to their chlorides. The hydrochloric acid is vaporized at 110°C in exchanger 7 and the vapor, containing 4 parts by weight of water for each part of HCl, is mixed with the flue gas entering the furnace or reactor.

An outlet 8 is provided on furnace 2 for extracting therefrom the purified hematite which contains 11% Si, less than 0.05% Zn, less than 0.05%Pb, less than 0.02%Cu, and less than 0.002% As.

The gas issuing from furnace 2 is freed from dust in cyclones 9 and 10, the dust thus recovered being returned to said durnace, and thereafter cooled at 350°C in a heat exchanger 11 which may be combined with heat exchanger 7 so that the sensible heat of the reaction products is used for vaporizing the 20% hydrochloric acid.

The gas leaving heat exchanger 11 enters a scrubbing tower 12 through which a pump 13 circulates an aqueous solution which absorbs all the chlorides and the excess hydrochloric acid. The temperature of said solution is maintained constant by a cooler 14 and the composition thereof is also maintained constant by a continuous tapping through line 15 and a corresponding addition of water through line 16.

The solution removed through line 15 contains all the chlorides and the excess hydrochloric acid. The further processing thereof is selected to the compounds which it is desired to obtain.

EXAMPLE 2

Figure 2:
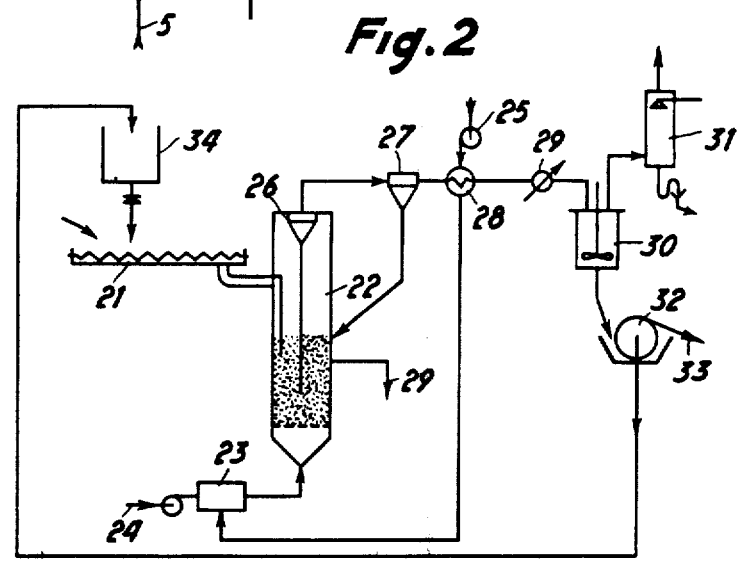
FIG. 2 is a similar representation of an apparatus in which ammonium chloride is used.

This example is carried out in the apparatus of FIG. 2.

10 metric tons per. hr. of the same pyrites cinders as in example 1 are wetted with 1736kg per. hr. of a 25% ammonium chloride solution added with 10 kg per hr. of 20% ammonia. This wetting is carried out in an anger 21 which feeds a fluidization furnace 22 (or reactor).

Fludization is achieved by means of flue gas from the combustion in combustion chamber 23 of about 140 c.m. per. hr. of natural gas fed through line 23. Air for the combustion is fed to chamber through a compressor 25 and is preheated in a heat exchanger 28; it is used in such a proportion that the flue gas is neutral or contains a slight excess of unburnt fuel.

The fuel input is controlled in such a manner that the temperature of the fluidized bed is 650°C. The dimensions of furnace 22 are such that the residence time of the iron oxide is 15 min.

The purified ore is extracted from furnace 22 through an outlet 29, the impurities contents of said purified ore being the same as in example 1. The gas from furnace 22 is freed from dust in cyclones 26 and 27, and cooled, first in heat exchanger 28 which is used for heating the air fed to combustion chamber 23, then in cooler 29. Since the pH value of the condensate remains at all points above 8, exchanger 28 and cooler 29 are made of ordinary, non-alloyed steel.

In furnace 22, the ammonium chloride is dissociated according to reaction:

$$NH_4Cl = NH_3 + HCl \qquad (4)$$

Since a 25% ammonium chloride solution is used, 3 parts of water are introduced in the reactor for each part of hydrochloric acid.

The hydrochloric gas is combined with the metals (Me) according to the reaction:

$$MeO + 2HCl = MeCl_2 + H_2O \qquad (5)$$

In exchanger 28, the excess hydrochloric acid is combined with the ammonia to form ammonium chloride. The metal chlorides also react with the ammonia according to the reaction:

$$MeCl_2 + 2NH_3 + 2H_2O = Me(OH)_2 + 2NH_4Cl \qquad (6)$$

The total result of reactions (4), (5) and (6) is:

$$MeO + H_2O = Me(OH)_2$$

One mole of water is therefore consumed for each two moles of ammonium chloride used in the process and the issuing solution does not tend to be diluted by the water introduced with the carrier flue gas.

The condensate from cooler 29 is transferred to a container 30 provided with an agitator. It is formed of a suspension of arsenous anhydride and of zinc, lead and copper hydroxides in an ammonium chloride solution. The residual gas escaping from container 30 is scrubbed in a scrubber 31 and said suspension is filtered through a rotating filter 32. The separated mixture of solid oxides and hydroxides is collected at 33 and the further processing thereof is selected according to the desired final products. The ammonium chloride solution is send to a container 34 from which it is recycled.

EXAMPLE 3

This example relates to a modification of example 2, and is carried out in the apparatus of FIG. 3.

10 metric tons per hr. of the same pyrites cinders as in examples 1 and 2 are fed continuously to a fluidization furnace 42. The fluidization is achieved by means of flue gas resulting from the combustion, in a combustion chamber 43, of about 140 c.m. per hr. of natural gas fed through line and compressor 44. Air for the combustion is fed through line and compressor 45 and is heated in a heat exchanger 53. It is used in a proportion such that the ratio $CO_2$ : $(CO + H_2)$ is 85: 15 in the flue gas. Steam is introduced in combustion chamber 43 through a line 46 provided with a control valve (not shown) in order to prevent formation of carbon black. The flow rate of fuel is controlled in such a manner that the temperature of the fluidized bed is 675°C. The dimensions of furnace 42 are selected to allow a residence time of the iron oxide of 60 min. in said furnace.

1736 kg per hr. of a 25% ammonium chloride solution added with 10 kg per hr. of 20% ammonia are fed by a pump 47 from a vat 49 to a tubular furnace 48. Said solution is heated at 100°–110°C in the convection zone of furnace 48, and thereafter vaporized in the radiation zone of said furnace, where the vapors are heated up to 400°–450°C. The vapors then pass to furnace 42 in admixture with the carrier flue gas.

Magnetite containing 11% Si, less than 0.05% Zn, less than 0.05% Pb, less than 0.02%Cu, and less than 0.002% As is extracted from furnace 42 by outlet 50.

The gas from furnace 42 is freed from dust in cyclones 51 and 52, cooled in heat exchanger 53 and in cooler 54, the condensate being processed as in example 2 and the filtered ammonium chloride solution being returned to vat 49.

EXAMPLE 4

The apparatus shown at FIG. 4 corresponds to the case where hydrochlorination of the initial iron oxide is operated in two furnaces arranged in series, the first furnace being fed with anhydrous hydrochloric gas, and the second with 20% hydrochloric acid.

10 metric tons per hr. of pyrites cinders containing 10.0% Si, 1.10% Zn; 0.50% As, 0.75% Al, 0.27% Mo 0.18% Sb, 0.72% Sn, 0.82% Pb, and 0.63% Cu are fed from hopper 61 to a fluidization furnace 62. Fluidization is achieved by means of flue gas from the combustion of about 130 c.m. per hr. of natural gas which is fed to a combustion chamber 63 by a compressor 64. Air for the combustion is fed by a compressor 65 in such a proportion that the flue gas contains an excess of oxygen of 0.5 to 1.0% by volume. The flow rate of fuel gas is controlled to provide a temperature of 550°C in the fluidized bed. The dimensions of furnace 62 are such that the residence time of the iron oxide therein is 15 min.

500 kg per hr. of anhydrous hydrochloric gas are fed by compressor 66 to furnace 62, in admixture with the flue gas, said quantity corresponding to 70% of that which is stoichiometrically required to convert all the metal impurities of the iron oxide to chlorides. The fluidized bed overflows through line 67 from furnace 62 to a second, two stage fluidization furnace 68. Fluidization is achieved therein by means of flue gas from the combustion of 70 c.m. per hr of natural gas fed to a combustion chamber 69 through a compressor 70. Air for the combustion is fed through compressor 71 in such a proportion that the ratio $CO_2$: $(CO + H_2)$ in the flue gas is 85:15. Steam is introduced in combustion chamber 69 through a line 72, provided with a control valve (not shown) in order to prevent formation of carbon black. The flow rate of fuel gas is controlled to provide a temperature of 675°C in the fluidized bed. The iron oxide remains an average of 75 min. in each stage of furnace 68. The iron oxide flowing out of furnace 67 passes first in the upper stage of furnace 68 and overflows therefrom to the lower stage.

1500 kg per hr. of 20% hydrochloric acid is injected tthrough pump 73, vaporized in heat exchanger 74 and mixed with the flue gas before entering at the base of furnace 68. The total quantity of hydrochloric acid introduced in the two furnaces thus represents an excess of 12% over that which is theoretically required to convert the non ferrous metals in the iron oxide to chlorides.

A sample tapped off line 67 shows that the iron oxide issuing from furnace 62 still contains 10% $SiO_2$, 0.7% Zn, 0.08% As, 0.05% Al, 0.04% Mo, 0.2% Sb, 0.43% Sn, 0.82% Pb, and 0.63% Cu.

Through outlet 75 provided in the lower stage of furnace 68 a purified magnetite is extracted containing a maximum of 10% $SiO_2$, 0.05% Zn, 0.002% As, 0.01% Al, 0.01% Mo, 0.005% Sb, 0.03% Sn, 0.05 % Pb and 0.02% Cu. By further purification in a magnetic separator, the $Fe_3O_4$ content is brought to 98.5 – 99%.

The gas issuing from furnace 62 is freed from dust in cyclones 76 and 77 and that issuing from furnace 68 in cyclones 78 and 79. Said gases are then mixed and cooled in a heat exchanger 80. The chlorides are recovered in a scrubbing tower 81 as in Example 1.

EXAMPLE 5

30 kg. per hr of pyrites cinders containing 11% $SiO_2$, 1.2% Cu, and 0.1% Zn were fed to a two stage fluidization furnace of 20 cm diameter. Fluidization was achieved by means of neutral flue gas which maintained a temperature of 650°C in the fluidized bed. 2.5 kg per hr. of a solution containing 35% ferrous chloride ($FeCl_2$) and 65% water were introduced in the fluidized bed. The gaseous mixture issuing from the furnace was cooled to cause the condensation of 2.4 kg per hr. of an aqueous solution containing 0.75 kg per hr. of copper chloride (Cu $Cl_2$) and 0.06 kg per hr. of zinc chloride (Zn $Cl_2$). Said solution was received in a reactor provided with agitator means in which 0.35 kg per hr. of iron filings was introduced. The suspension leaving said reactor was passed through a filter to separate 0.4 kg per hr. of copper cement at about 90% Cu from 2.5 kg per hr a 35% solution of ferrous chloride also containing zinc chloride. In order to limit the increase of concentration of zinc chloride in said solution, an aliquot part of 0.125kg per hr. thereof was tapped off and replaced by an equal weight of 20% hydrochloric acid. Said tapped aliquot part was treated by known means to valorize the iron and zinc chlorides therein.

A mixture of iron oxides containing a maximum of 10% $SiO_2$ less than 0.03%Cu, and less than 0.01% Zn was extracted from the fluidization furnace. Said mixture was treated in a second fluidization furnace by means of flue gas from the incomplete combustion of fuel gas, the $CO_2$: $(CO + H_2)$ ratio in said flue gas being 17 : 3, at a temperature of 600°C. All the iron oxides were thus converted to magnetite $Fe_3O_4$ and the iron oxide content of the mass was finally increased to 98% in a magnetic separator. Said magnetite contained the iron which preexisted in the treated ore, thus the iron used to separate the copper through cementation.

EXAMPLE 6

This example is carried out in the apparatus of FIG. 2. 12 metric tons per hr. of natural hematite containing 12% $SiO_2$, 0.5% As, 0.1% Sb and 0.07% Cu milled to a grain size of less than 0.1 mm are wetted with 1.150 kg per hr. of a 25% ammonium chloride solution added with 8 kg per hr. of 20% ammonia. This wetting is carried out in an anger 21 which feeds a fluidization furnace 22.

Fluidization is achieved by means of flue gas from the combustion in combustion chamber 23 of about 140 c.m. per hr. of natural gas fed through line 23. Air for the combustion is fed to chamber through a compressor 25 and is preheated in a heat exchanger 28; it is used in such a proportion that the flue gas contains a slight excess of unburnt fuel.

The fuel input is controlled in such a manner that the temperature of the fluidized bed is 500°C. The dimensions of furnace 22 are such that the residence time of the iron ore is 15 min.

The purified ore is extracted from furnace 22 through an outled 29, the impurities contents of said purified ore being 12% $SiO_2$, less than 0.002% As, less than 0.002% Sb and less than 0.02% Cu. The gas from furnace 22 is freed from dust in cyclones 26 and 27, and cooled, first, in heat exchanger 28 which is used for heating the air fed to combustion chamber 23, then in cooler 29. Since the pH value of the condensate reamins at all points above 8, exchanger 28 and cooler 29 are made or ordinary, non-alloyed steel.

The reactions are the same as in example 2.

The condensate from cooler 29 is transferred to a container 30 provided with an agitator. It is formed of a suspension of $As_2O_3$, $Sb_2O_3$ and Cu $(OH)_2$ in an ammonium chloride solution. The residual gas escaping from container 30 is scrubbed in a scrubber 31 and said suspension is filtered through a rotating filter 32. The separated mixture of solid oxides and hydroxides is collected at 33 and the further processing thereof is selected according to the desired final products. The ammonium chloride solution is send to a container 34 from which it is recycled.

We claim:

1. A method for the purification of iron oxides containing non-ferrous metals impurities consisting essentially of intimately contacting said oxides in a reaction zone at a temperature of about 550° – 700°C with a vapor mixture of a halohydric gas in the presence of 0.5 to 10 parts by weight of steam per each part by weight of halohydric gas, whereby halides of non-ferrous metal impurities are formed and vaporized, leaving iron oxide as a solid phase, carrying off said vaporized halides out of said reaction zone by means of a current of a hot carrier gas flowing through said reaction zone, and recovering purified iron oxodes from said reaction zone.

2. A method as claimed in claim 1, in which said halohydric gas and said stream are formed by vaporizing an aqueous solution of a halohydric acid the concentration of which corresponds to the requested proportions of halohydric gas and water, respectively.

3. A method as claimed in claim 2, in which said halohydric acid solution is vaporized and mixed with said carrier gas before being fed to the reaction zone.

4. A method as claimed in claim 2, in which said halohydric acid is hydrochloric acid.

5. A method as claimed in claim 3, in which said halohydric acid solution is a 20% hydrochloric acid solution.

6. A method as claimed in claim 1, in which said vaporized non-ferrous metals chlorides are condensed after leaving the reaction zone.

* * * * *

UNITED STATES PATENT OFFICE
CERTIFICATE OF CORRECTION

Patent No. 3,896,211  Dated July 22, 1975

Inventor(s) YOLAND PIERRE PAUL MAYOR and PIERRE FRANCOIS TORD

It is certified that error appears in the above-identified patent and that said Letters Patent are hereby corrected as shown below:

| Col. | Line | Page | Line | |
|------|------|------|------|---|
| [73] | | | | Assignee: Cancel "Harle & Lechopiez" there is no Assignee |
| 6 | 67 | 15 | 6 | "durnace" should be --furnace-- |
| 10 | 45 | 23 | 8 | "reamins" should be --remains-- |

Signed and Sealed this fourth Day of May 1976

[SEAL]

Attest:

RUTH C. MASON
*Attesting Officer*

C. MARSHALL DANN
*Commissioner of Patents and Trademarks*